Aug. 5, 1947.  R. M. ISHAM  2,424,987
PROCESS FOR THE CONCENTRATION OF ACETYLENE
Filed July 13, 1942
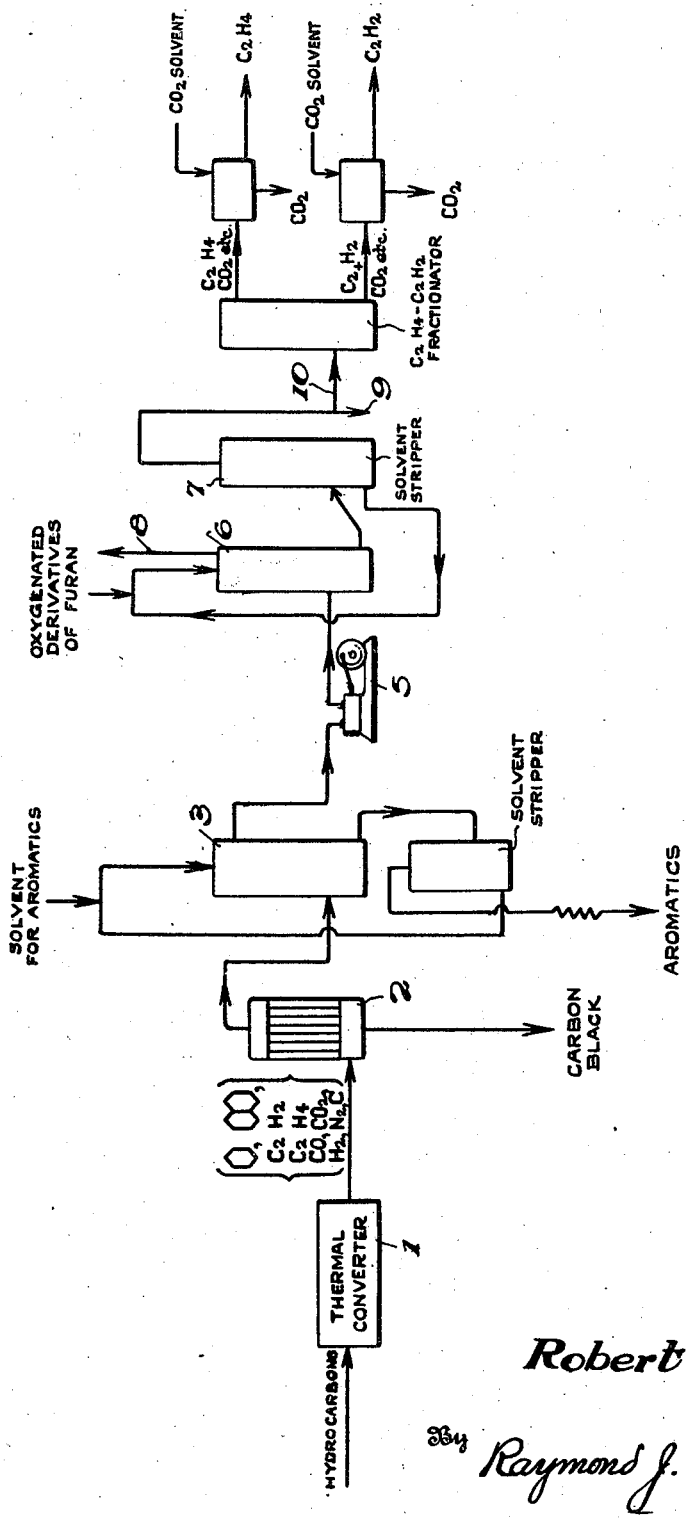
Inventor
Robert M. Isham.
By Raymond J. Norton
Attorney Patented Aug. 5, 1947

2,424,987

UNITED STATES PATENT OFFICE 2,424,987

PROCESS FOR THE CONCENTRATION OF ACETYLENE

Robert M. Isham, Okmulgee, Okla., assignor to Danciger Oil & Refineries, Inc., Fort Worth, Tex., a corporation of Texas Application July 13, 1942, Serial No. 450,771

1 Claim. (Cl. 183—115)

This invention relates to a method of extracting acetylene from gaseous mixtures thereof.

As is known, acetylene may be produced by thermal treatment of hydrocarbons by a variety of methods. Among such methods are the treatment of hydrocarbons of the methane and ethylene series by controlled pyrolysis; passage of such hydrocarbons through an electric arc, incomplete combustion and the like. In all such methods the reaction product is a gaseous mixture containing a relatively small percentage of acetylene. Depending upon the process employed this gaseous mixture includes hydrogen, carbon monoxide, carbon dioxide, methane and ethylene. The reaction mixture may also contain vapors of benzene, naphthalene and other aromatic hydrocarbons, as well as some carbon black.

A major problem in this art is the separation of the several constituents and particularly the concentration and/or separation of the acetylene from the reaction mixture.

In the past it has been suggested to use selective solvents to separate the acetylene. For this purpose various solvents have been proposed such as, esters of polyhydric alcohols, esters of polybasic acids, polyketones, aliphatic lactones and the like. As explained in copending application, Serial No. 415,975, filed October 21, 1941, now Patent No. 2,383,551, issued August 28, 1945, the selective solvent extraction of the acetylene may comprise a step in a continuous operation in which the crude reaction gases are first scrubbed to remove aromatic constituents and then are contacted with a selective solvent to produce a product enriched in acetylene.

These extraction products, though enriched in acetylene contain appreciable amounts of other gases present in the original gas mixture. For some purposes it is desirable to remove such other gases, particularly ethylene before the recovered acetylene can be utilized. In any event there is a real need in the field for readily available materials which present a good solvent power for acetylene and are further characterized by a high selectivity for acetylene.

As a result of extensive experimentation in this field it has been ascertained that certain heterocyclic compounds having an oxygenated side chain, notably oxygenated derivatives of furan admirably fulfil the criteria of good selective solvents for acetylene.

In order to fully describe the essential principles of the invention the main steps of a typical process are illustrated in the flow sheet of Fig. 1.

The efficacy of the described groups of compounds for the purposes of the invention can readily be appreciated from a consideration of the data in Table I which shows the solubility of the various gases (in the reaction mixtures which are treated) in typical of such oxygenated furan derivatives.

Table I

| Solvent | $C_2H_2$ | $C_2H_4$ | $CH_4$ | $H_2$ | CO | $CO_2$ | $N_2$ |
|---|---|---|---|---|---|---|---|
| Furfuryl acetate | 7.87 | 1.67 | 0.69 | 0.00 | 0.098 | 3.18 | 0.57 |
| Furfural | 7.40 | | | | | | |
| Tetrahydrofurfuryl alcohol | 10.06 | 1.34 | 0.70 | 0.00 | 0.131 | 2.46 | 0.39 |
| Tetrahydrofurfuryl acetate | 13.05 | 1.96 | 0.85 | 0.00 | 0.196 | 4.29 | 0.164 |

The results in the table are expressed in volumes of the particular gas dissolved in unit volume of the solvent, at approximately 25° C. It will be observed that the solvents of this class are particularly effective for the desired use. They present no solubility for hydrogen, relatively low solubility for methane, carbon monoxide and nitrogen and present marked selectivity for acetylene, particularly as against ethylene. It is to be observed also that the oxygenated derivatives of tetrahydrofuran possess a higher solvent power for acetylene than the oxygenated derivatives of furan. The ability of these solvents to dissolve approximately five times or more acetylene than ethylene establishes them as excellent solvents for the purposes of the invention.

In carrying out the process the crude gaseous reaction mixture may, if desired, be subjected to any preliminary treatment, such as scrubbing with straw oil to remove benzol and other aromatic constituents and the gas may then be treated with one of the group of solvents mentioned to enrich it in acetylene. For this purpose the gas containing the acetylene is preferably compressed and then contacted with the solvent in the proper ratio. This contact may be done most effectively in a countercurrent system. Upon separation of the solvent and evolution of the dissolved gases, by reduction of pressure coupled with the application of heat if desired, a gaseous mixture greatly enriched in acetylene is produced. As will be appreciated, the present improvement, i. e., the step of enriching a gas in acetylene may be embodied in any continuous method of treating reaction gases of the type described.

The efficacy of this group of solvents will be more readily appreciated, by a consideration of actual operations. A gas mixture was produced by partial combustion of methane and the gaseous products were subjected to a countercurrent scrubbing with tetrahydrofurfuryl acetate in a bubble tower under a pressure of 300 pounds per sq. in. at atmospheric temperature. In the extraction one gallon of the solvent was circulated for each 38 cu. ft. of gas treated. It was ascertained that 98% of the acetylene in the crude reaction gases was dissolved.

The solvent was withdrawn from the base of the bubble tower and heated to the boiling point at atmospheric pressure to evolve the dissolved gases. The marked enrichment of the gas in acetylene as a result of this treatment is shown in the following table.

*Table II*

|  | $C_2H_2$ | $C_2H_4$ | $CH_4$ | $H_2$ | $CO$ | $CO_2$ | $N_2$ |
|---|---|---|---|---|---|---|---|
|  | Per cent | Per cent | Per cent | Per cent | Per cent | Per cent | Per cent |
| Original gas | 4.4 | 2.1 | 3.6 | 31.6 | 8.3 | 1.2 | 48.8 |
| Enriched gas | 72.4 | 5.2 | 3.85 | 0.0 | 2.05 | 6.5 | 10.0 |

It will be observed from an inspection of this table that concentration of acetylene in the original gas was increased about fifteen fold and that the enriched gas contained but about twice as much ethylene as the original gas.

The enriched gas produced by such solvent extraction may be used directly for many purposes without further purification. If desired, the enriched gas may be subjected to further refining to produce an acetylene of any desired degree of purity.

Results equivalent to those indicated above may be secured by employing other solvents of the class described as well as by the use of other furan derivatives containing an oxygenated side chain such as esters of furoic acid.

As will be appreciated, the invention is of broad applicability and may be utilized to treat any gas mixture containing acetylene to obtain a gas enriched in acetylene. The improved method is of special utility embodied in a continuous process in which crude reaction gases are treated to obtain either a gas enriched in acetylene or substantially pure acetylene together with ethylene.

The operation of the improvement in such a complete process is illustrated in Fig. 1. As there shown, hydrocarbon gases or vapors are treated in converter 1 to produce acetylene. This conversion may be effected in an electric arc furnace, partial combustion apparatus and the like. The reaction gas as previously noted is a mixture containing carbon monoxide, carbon dioxide, carbon black, aromatics such as benzene and naphthalene and of the alkene and alkyne hydrocarbons mentioned.

The gaseous mixture may then be treated to remove and recover the carbon black. This may be done in any suitable separating apparatus such as a filter or, as shown, in a Cottrell precipitator 2.

The gas mixture, freed of the entrained solids is then preferably treated to remove the aromatic constituents. This may be done by passing the gas to the scrubber 3 and subjecting it to countercurrent scrubbing with a suitable solvent. As explained in copending application Serial No. 415,975, a particularly effective solvent for this purpose is "limpid oil," i. e., a mixture of coal tar hydrocarbons boiling between 220° C. and 264° C. This solvent very effectively extracts the vapors of benzene and naphthalene from the gas stream. The solvent is passed to a stripper in which it is separated from the aromatics by distilling off and condensing the vapors of the aromatic hydrocarbons. The stripped solvent, as shown, is recycled for further extraction.

The gas which is denuded of aromatics may then be passed to the compressor 5 in which it is compressed to any desired degree and the compressed gas is passed to the solvent extraction tower 6. While compression of the gas prior to contact with the novel solvents is desirable it will be appreciated that this is not essential for the improvement described herein broadly comprehends enrichment of acetylene by treatment of either gaseous or liquid mixtures thereof.

In the extraction stage 6 the compressed gas is contacted, preferably countercurrently, with a stream of one of the class of solvents described. The solvent with its preferentially dissolved acetylene accumulates in the base of the apparatus and is passed to the stripping column 7 to separate the solvent from the acetylene and other dissolved gases. As noted previously this may readily be done by reducing the pressure in tower 7 to evolve the gases as an overhead fraction. This action may be accelerated, if desired, by heating the solvent extract. The solvent accumulating in the base of tower 7, as shown, is recycled to extraction column 6 for further extraction. The components of the gaseous mixture which are not extracted by the solvent may be drawn off from tower 6 through line 8 and treated in any desired manner.

The gases withdrawn overhead from tower 7 are highly enriched in acetylene having a composition comparable to the sample given in Table II. For many purposes such an enriched gas may be used directly and if so desired it may be withdrawn from the system through line 9. For certain purposes it is desirable to further purify this gas, as for example, when the acetylene is to be hydrated to acetaldehyde. This hydration is effected in the presence of a mercury catalyst. Ethylene rapidly destroys this catalyst and hence acetylene for this conversion must be free of ethylene.

As described in the copending application this purification may be effected by fractionating the acetylene-ethylene mixture in the presence of carbon dioxide. Such a separation may be utilized in the present operation. For this purpose the gas mixture is passed through line 10, together with the requisite amount of $CO_2$ (if not present naturally in the gas) into the fractionating system 11, in which the gas is compressed to partial liquefaction and is fractionally distilled to separate a liquid fraction containing acetylene and carbon dioxide and a gas fraction containing ethylene and carbon dioxide. These fractions may then be separately treated to remove the contained carbon dioxide, as for example, by scrubbing with a selective solvent for carbon dioxide, such as an aqueous solution of an alkali carbonate, triethanolamine and the like.

The class of solvents described herein are of peculiar utility in this field. It is to be observed that their high solvent power for acetylene is of special value since the reaction gases which are treated contain but a minor percentage of acetylene; such gases usually analyze between about 2% to about 5% acetylene. The high solvent power of the improved solvents thus insures high extraction with relatively low ratios of circulated solvent. Similarly the high selectivity of this group of solvents is a salient and unpredictable characteristic. This selectivity, as against ethylene is so marked that the treatment described substantially constitutes a solvent fractionation of acetylene and ethylene. This is clearly apparent from an inspection of Table II wherein the enriched gas contained but slightly more ethylene than the initial gas whereas the acetylene content of the enriched gas was tremendously increased.

While specific examples of the improved type of selective solvents for acetylene have been described it is to be understood that these are given to illustrate the value of the stated group of polar compounds having the described desirable characteristics.

I claim:

In the concentration of acetylene from gaseous mixtures thereof, which comprises, contacting the mixture with tetrahydrofurfuryl acetate.

ROBERT M. ISHAM.

REFERENCES CITED

The following references are of record in the file of this patent:

UNITED STATES PATENTS

| Number | Name | Date |
|---|---|---|
| 1,882,978 | Schmidt et al. | Oct. 18, 1932 |
| 2,146,448 | Scott et al. | Feb. 7, 1939 |
| 2,205,996 | Van Wijk | June 25, 1940 |
| 2,250,925 | Babcock | July 29, 1941 |
| 1,919,752 | Schmidt et al. | July 25, 1933 |
| 1,948,777 | Young et al. | Feb. 27, 1934 |
| 2,217,429 | Balcar | Oct. 8, 1940 |
| 2,063,680 | Isham | Dec. 8, 1936 |